(12) United States Patent
Ikezawa

(10) Patent No.: US 8,390,994 B2
(45) Date of Patent: Mar. 5, 2013

(54) ELECTRONIC APPARATUS

(75) Inventor: Teruaki Ikezawa, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 13/020,608

(22) Filed: Feb. 3, 2011

(65) Prior Publication Data

US 2011/0194235 A1 Aug. 11, 2011

(30) Foreign Application Priority Data

Feb. 5, 2010 (JP) ................................ 2010-024594

(51) Int. Cl.
*G06F 1/16* (2006.01)
*H05K 5/00* (2006.01)
*H05K 7/00* (2006.01)
*H05K 9/00* (2006.01)
*G02F 1/1333* (2006.01)
*G06F 3/041* (2006.01)

(52) U.S. Cl. .............. 361/679.21; 361/679.26; 345/173; 349/58; 174/350; 174/355

(58) Field of Classification Search ............ 361/679.01, 361/679.21–679.3; 313/582; 349/58–60; 174/350–358; 345/173
See application file for complete search history.

(56) References Cited

U.S. PATENT DOCUMENTS

| | | | |
|---|---|---|---|
| 6,229,085 B1* | 5/2001 | Gotoh et al. .................. 174/353 |
| 7,271,861 B2* | 9/2007 | Yamazaki ........................ 349/58 |
| 7,324,172 B2* | 1/2008 | Yamazaki ........................ 349/58 |
| 7,362,043 B2* | 4/2008 | Cha ................................ 313/112 |
| 7,738,264 B2* | 6/2010 | Christol et al. ............... 361/818 |
| 7,965,517 B2* | 6/2011 | Mayumi et al. ............... 361/753 |
| 2001/0010569 A1* | 8/2001 | Jin et al. .......................... 349/58 |
| 2003/0218700 A1* | 11/2003 | Tsukamoto .................... 349/58 |
| 2005/0117086 A1* | 6/2005 | Sugahara et al. ............... 349/58 |
| 2005/0285991 A1* | 12/2005 | Yamazaki ........................ 349/58 |
| 2006/0152664 A1* | 7/2006 | Nishio et al. ................... 349/150 |
| 2006/0238446 A1* | 10/2006 | Takahashi et al. .............. 345/55 |
| 2007/0002535 A1* | 1/2007 | Kim ................................ 361/692 |
| 2007/0008449 A1* | 1/2007 | Choi ................................ 349/58 |
| 2007/0222912 A1* | 9/2007 | Sato et al. ........................ 349/58 |
| 2008/0002093 A1* | 1/2008 | Kim ................................. 349/58 |
| 2008/0252808 A1* | 10/2008 | Chang ............................ 349/58 |
| 2009/0122475 A1* | 5/2009 | Kim ........................... 361/679.21 |
| 2010/0039580 A1* | 2/2010 | Chen et al. ...................... 349/58 |

FOREIGN PATENT DOCUMENTS

JP 11-185991 A 7/1999

* cited by examiner

*Primary Examiner* — Adrian S Wilson
(74) *Attorney, Agent, or Firm* — Canon USA Inc IP Division

(57) ABSTRACT

In an electronic apparatus, a flexible wiring board is connected with a display unit and a cutout portion is formed at a part of a rear cover adjacent to the wiring board. A grip member is fixed on the rear cover so as to cover the cutout portion. A discharge member is electrically connected with the rear cover and provided at the cutout portion exposing its surface.

6 Claims, 3 Drawing Sheets

ELECTRONIC APPARATUS

BACKGROUND OF THE INVENTION

1. Field of the Invention

The present invention relates to an electronic apparatus equipped with a touch panel. More particularly, the present invention is suitably used in an electronic apparatus in which the touch panel and a non-conductive exterior member are provided across a gap.

2. Description of the Related Art

In a recent year, products equipped with a touch panel in an electronic apparatus have been known. An operation with the touch panel is superior in a graphical user interface (GUI) compared with a conventional operation with a physical button. With the touch panel, an intuitive operation can be performed while looking at a screen, and can realize various operability according to software.

In a case of a general touch panel of a resistance film type, to protect wirings from the resistance film at the uppermost surface of the touch panel to an internal of a main body of the apparatus, the touch panel is located one step lower than a surrounding exterior member so as to cover an edge of the touch panel with the exterior member. However, in an electronic apparatus in which downsizing and thinning are required, in a recent year, the touch panel and the exterior member have been designed to be at an approximately same surface level.

When the touch panel and the surrounding exterior member are located at the approximately same surface level, a gap is generated between the touch panel and the exterior member in consideration of a building-in process. If the exterior member is made of a conductive material, static electricity flows to an earth portion of a circuit board through the exterior member when static electricity is applied on a surrounding of the touch panel.

However, if the exterior member is made of a non-conductive material, the applied static electricity flows in a circuit of the touch panel through the aforementioned gap and may cause an error operation in a product. Therefore, in a case of an electronic apparatus having the exterior member made of a non-conductive material, a mechanism for preventing flowing-in of the static electricity to the circuit of the touch panel is necessary.

For example, Japanese Patent Application Laid-Open No. 11-185991 discusses the electronic apparatus in which a transparence conductive film sheet is stuck on a surface of a liquid crystal display panel and a conductive sheet with a conductive adhesive is stuck on the conductive film sheet. The conductive sheet with the conductive adhesive is crimped to an earth portion which is a ground potential side. Therefore, the static electricity applied on the liquid crystal display panel transmits through the transparent conductive film sheet, further transmits through the conductive sheet with the conductive adhesive, and fall down to the ground of a power source.

However, in the technique discussed in Japanese Patent Application Laid-Open No. 11-185991, the sticking strength of the adhesive in the conductive sheet with the conductive adhesive may change due to a change with the passage of time, so that a stable performance may not be provided for a long time period.

Further, in a recent year, to produce a thin device and improve visibility, a number of an electronic apparatus, in which a touch panel is fixed to a liquid crystal display element, has been increased. In the apparatus with such a configuration, the touch panel and the liquid crystal display element are fixed in a state enabling movement by a predetermined amount in a perpendicular direction to a display screen. In such an apparatus, a structure which is called as a floating structure has been often adopted. In the floating structure, the touch panel is moved and positioned to an opening of the apparatus exterior at a time of assembling. Since the touch panel and the earth portion are relatively movable, it is not easy to obtain a stable connection by using the aforementioned conductive sheet with the conductive adhesive.

SUMMARY OF THE INVENTION

According to an aspect of the present invention, an electronic apparatus includes a display unit, a flexible wiring board, a cover member, an exterior member, and a discharge member. The flexible wiring board is connected with the display unit. The cover member is made of a conductive material and forms a cutout portion adjacent to the flexible wiring board. The exterior member is made of a non-conductive material, has an end opposing an end surface of the display unit via gap, and is fixed to the cover member so as to cover the cutout portion. The discharge member electrically connected to the cover member and is provided at the cutout portion, exposing its surface.

According to the present invention, even when an electronic apparatus has a gap formed between the display unit and the non-conductive exterior member, the electric apparatus can stably flow static electricity entering from the gap, to an earth portion of a circuit board.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The exemplary embodiment according to the present invention will be described referring to the figures as follows. In the present exemplary embodiment, a digital camera (hereinafter refers to as a camera) is described as an example of an electronic apparatus. In each figure, a direction of the camera toward an object is a front, which is indicated by Fr, and the opposite direction is a rear, which is indicated by Rr, as needed. Similarly, in FIG. 1B and FIG. 2, a grip side of the camera is a right side of the camera, and is indicated as Ri, and the opposite side is a left side of the camera and is indicated as Le.

Figure 1A:
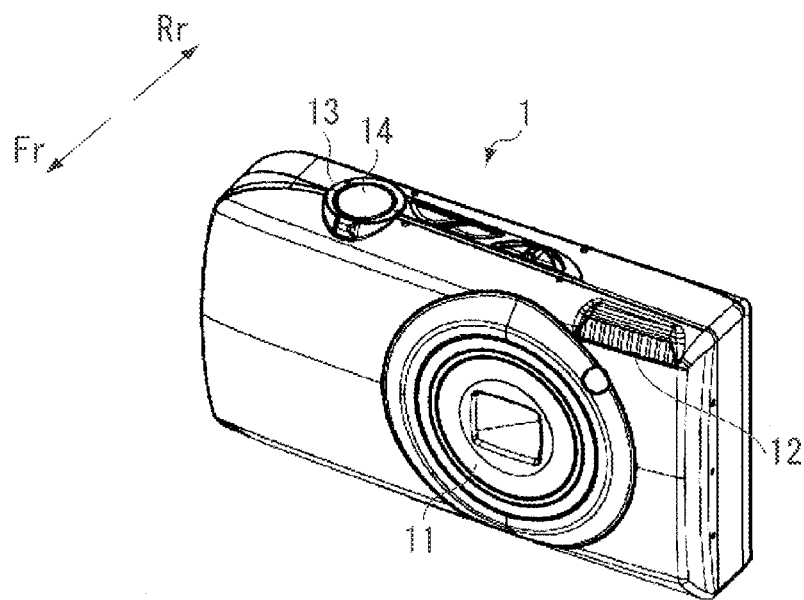
FIGS. 1A and 1B illustrate outer appearances of the camera according to the exemplary embodiment of the present invention.
Figure 1B:
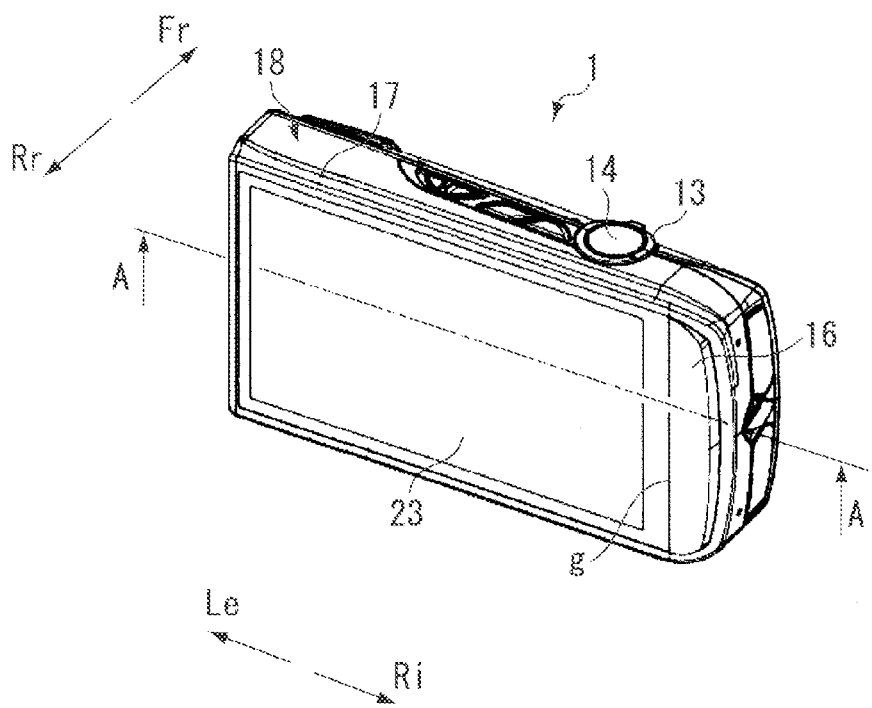

At first, an outline of the whole of the camera according to the present exemplary embodiment will be described referring to FIG. 1. FIG. 1A is a perspective view of the camera as viewed from a front surface side (an object side). FIG. 1B is a perspective view of the camera as viewed from a back surface side (a photographer side).

As illustrated in FIG. 1A, a lens barrel portion 11 is located at a front surface portion of the camera body 1. At an upper surface portion of the camera body 1, a flash window 12, a zoom lever 13, and a release button 14 are located. The flash window 12 flashes as needed when a light quantity is insufficient at a time of photographing.

A photographer operates the zoom lever 13 to determine a proper angle of view and starts photographing operation of the camera body 1 by operating the release button 14. More specifically, an object image is taken by an image pickup element, which is not illustrated, through the lens barrel portion 11. The object image thus taken is processed to image data by a calculation element not illustrated, and then written in a recording medium not illustrated.

Further, as illustrated in FIG. 1B, a display unit 23 is located at the back surface of the camera body 1. The display unit 23 is a display unit in which a touch panel 15 is stuck on a display surface of a liquid crystal display element 20. The photographer can send photographing conditions to the camera body 1 by operating the touch panel 15 with fingers.

An exterior unit 18 surrounds a periphery of the display unit 23. As illustrated in FIG. 1B, at a right end of the display unit 23, a grip member 16 is located. In this structure, the right end of the display unit 23 and the grip member 16 are situated at an approximately same surface level. A small gap g is formed between the right end of the display unit 23 and the grip member 16, in consideration of assembling work. In addition, the grip member 16 is formed at the right end of the back surface portion, from top to bottom to enable the photographer to touch the grip with his right hand when he holds the camera body 1. By providing the grip member 16 at such a position, the camera body 1 does not slide down from the hand of the photographer and the grip member 16 functions as a slide stopper.

As illustrated in FIG. 1B, an opening of the rear cover 17 is positioned at an upper end, a lower end, and a left end of the display unit 23. The upper end, the lower end, and the left end of the display unit 23 and the rear cover 17 are situated at an approximately same surface level. Further, slight gaps are formed between the upper end, the lower end, and the left end of the display unit 23 and the opening of the rear cover 17, in consideration of the assembly work of the camera.

Figure 2:
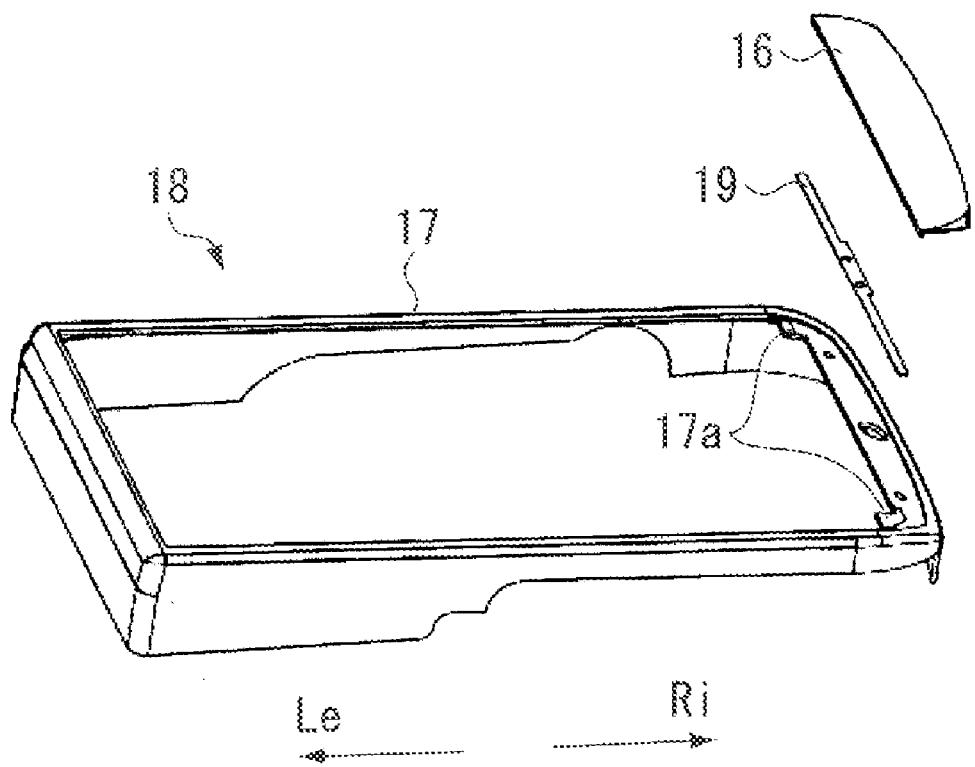
FIG. 2 is a decomposed perspective view illustrating the exterior unit of the camera according to the exemplary embodiment of the present invention.

FIG. 2 is a decomposed perspective view of the exterior unit 18. As illustrated in FIG. 2, the exterior unit 18 includes the rear cover 17 made of aluminum of which the surface is processed by alumite working, the grip member 16 made of a non-conductive resin, and a discharge metal plate 19 as a discharge member, where the discharge metal plate 19 is made of a conductive material having a spring property. The rear cover 17 is a cover member made of a metal on which surface treatment is carried out.

The discharge metal plate 19 is formed to have a thin and long plate shape in which the length is a little shorter than the longitudinal length of the grip member 16. The discharge plate 19 is inserted into a groove portion 16a formed on a surface of the grip 16 opposing the rear cover 17 and held with the grip member 16, so that the surface is exposed without exposing the end surface. The grip member 16 adheres and is fixed to one side of the rear cover 17 holding the discharge metal plate 19. The one side of the rear cover 17 is the right end of the rear cover 17 as viewed from the back surface of the camera body 1. Therefore, the discharge metal plate 19 is positioned between the grip member 16 and the rear cover 17 by fixing the grip member 16 to the rear cover 17 to adhere.

Further, by fixing the grip member 16 holding the discharge metal plate 19 to the rear cover 17 to adhere, the discharge metal plate 19 is elastically deformed by the spring property itself, and pushed to and contacts an area 17a of the rear cover 17. Since the surface alumite working is removed in the area 17a, the rear cover 17 and the discharge metal plate 19 become electrically connected when the discharge metal plate 19 contacts the exposed area 17a of the aluminum rear cover 17. Moreover, since the discharge metal plate 19 urges the area 17a by the spring force, the discharge metal plate 19 contacts the area 17a under a constant contact pressure. Thus, the electric connection between the rear cover 17 and the discharge metal plate 19 becomes constantly stable.

Figure 3:
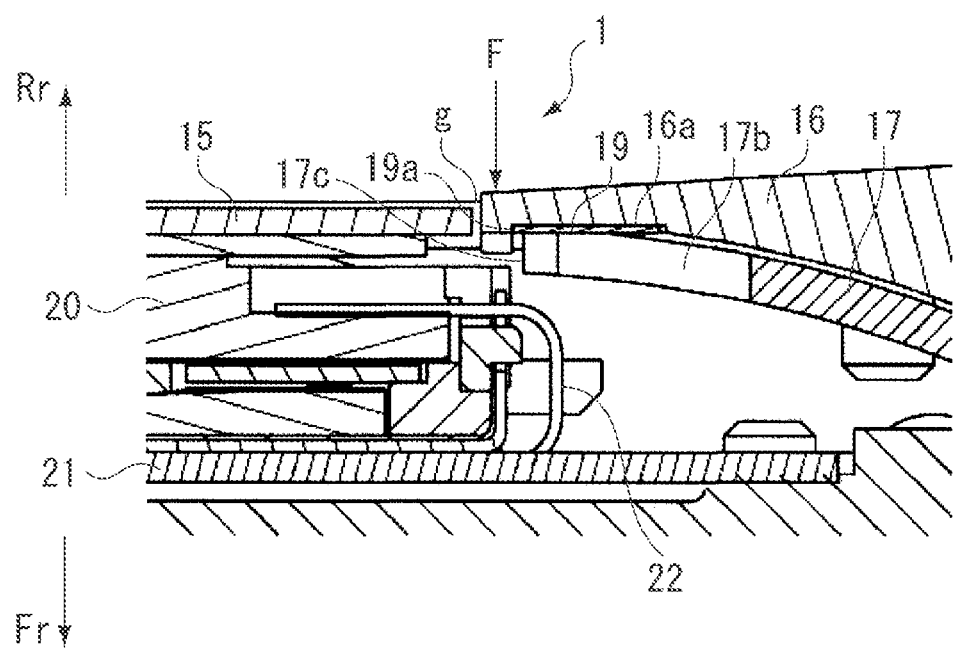
FIG. 3 is a cross-sectional view illustrating a part of the camera according to the exemplary embodiment of the present invention.

FIG. 3 is an enlarged figure of the right end of the display unit 23 in a cross section A-A in FIG. 1B. As illustrated in FIG. 3, the touch panel 15 is stuck on display surface of a liquid crystal display element 20. One end of a flexible wiring board 22 connects to the touch panel 15 and the liquid crystal display element 20, and the other end connects to the circuit board 21.

When a force is applied to the grip member 16 in a direction of the arrow F illustrated in FIG. 3, the rear cover 17 bends in the direction of the arrow F. At this time, if an edge of the rear cover 17 contacts the flexible wiring board 22, the edge may damage the flexible wiring board 22 because the rear cover 17 is made of aluminum.

According to the present exemplary embodiment, in consideration of this problem, a cutout portion 17b is formed at a part of the rear cover 17 which is adjacent to the flexible wiring board 22 and is covered with the grip member 16 made of a resin. With this structure, even if the rear cover 17 is bent in the direction of the arrow F, the grip member 16 only contacts the flexible wiring board 22, and the edge of the rear cover 17 does not contacts the flexible wiring board 22. The grip member 16 is made of a resin, so that the grip member 16 does not damage the flexible wiring board 22 even if the grip member 16 contacts the flexible wiring board 22.

Further, the discharge metal plate 19 is located between the grip member 16 and the rear cover 17. However, the discharge metal plate 19 is held being inserted into the groove portion 16a of the grip member 16, so that the end surface of the discharge metal plate 19 does not contact the flexible wiring board 22.

As illustrated in FIG. 3, a slight gap g is formed between the display unit 23 and the grip member 16. The discharge metal plate 19 is located between the grip member 16 and the rear cover 17, exposing the surface to the cutout portion 17b. As illustrated in FIG. 3, the end surface 19a of the discharge metal plate 19 slightly protrudes to the gap g from the end surface 17c of the rear cover 17. Further, the discharge metal plate 19 is located approximately parallel to the gap direction of the gap g (a direction perpendicular to the drawing page in FIG. 3), adjacent to the gap g. Therefore, the discharge metal plate 19 is arranged to be a conductive member closest to the gap g.

The rear cover 17 is at a ground potential by connection with the earth portion of the circuit board 21 (not illustrated). Therefore, the discharge metal plate 19 contacting the rear cover 17 is similarly at the ground potential.

Then, a case in which static electricity enters from the gap formed at the surrounding of the display unit 23 when a photographer operates the touch panel 15 will be described.

At first, the case in which the static electricity enters the camera body 1 from the gaps between the upper end, the lower end, and the left end of the display unit 23 and the rear cover 17, will be described. In this case, the entering static electricity discharges to the rear cover 17 near these gaps. Since the rear cover 17 is at the ground potential, the static electricity discharged to the rear cover 17 does not cause secondary discharge and does not affect the circuit board 21.

Then, the case in which the static electricity enters the camera body 1 from the gap g between the right end of the display unit 23 and the grip member 16, will be described. At first, when the static electricity enters the gap g between the display unit 23 and the grip member 16 in a state that the discharge metal plate 19 is not provided, a distance from the gap g to the rear cover 17 becomes larger compared with the case of aforementioned three sides because the cutout portion 17b is formed. Therefore, the static electricity entering from the gap g does not discharge to the rear cover 17 and flows into the circuit of the touch panel 15. Then, the static electricity flows into the circuit board 21 via the flexible circuit board 22 and may cause an improper operation of the circuit board 21.

In the present exemplary embodiment, the camera body 1 has the discharge metal plate 19 located at the cutout portion 17b exposing the surface. Accordingly, the static electricity entering from the gap g to the camera body 1 discharges to the surface of the discharge metal plate 19 which has lower impedance than the circuit of the touch panel 15. Since the discharge metal plate 19 is at the ground potential, the static electricity discharged to the discharge metal plate 19 does not cause secondary discharge and does not affect the circuit board 21.

Thus, according to the present exemplary embodiment, even when the camera has the gap g between the display unit 23 and the grip member 16, the camera can stably send the static electricity entering from the gap g, to the earth portion of the circuit board 21 via the discharge metal plate 19. Therefore, the improper operation of the camera by static electricity can be prevented.

In the aforementioned exemplary embodiment, the camera is described as an example of the electronic apparatus. However, the present invention is not limited to this case. The present invention can be applied to other electronic apparatuses in which the display unit and the exterior member are disposed across a gap.

In the present exemplary embodiment, the rear cover 17 is made of aluminum on which the alumite working is carried out. However, instead of aluminum, the rear cover 17 coated with stainless steel can have a similar effect in operation. In such a case, the coating is removed from the area 17a contacting the discharge metal plate 19, so that the electric connection between the discharge metal plate 19 and the rear cover 17 becomes favourable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-024594 filed Feb. 5, 2010, which is hereby incorporated by reference herein in its entirety.

What is claimed is:

1. An electronic apparatus comprising:
   a display unit;
   a flexible wiring board connected with the display unit;
   a cover member made of a conductive material and having a cutout portion adjacent to the flexible wiring board;
   an exterior member made of a non-conductive material and having an end opposing an end surface of the display unit, wherein the exterior member is fixed to the cover member so as to cover the cutout portion; and
   a discharge member electrically connected to the cover member and provided at the cutout portion so as to expose a surface of the discharge member.

2. The electronic apparatus according to claim 1, wherein the discharge member is provided approximately parallel to a direction of a gap.

3. The electronic apparatus according to claim 1, wherein a groove is formed at a surface opposing the cover member of the exterior member, and the exterior member is fixed to the cover member with the discharge member inserted into the groove.

4. The electronic apparatus according to claim 3, wherein the discharge member has a spring property and urges the cover member with the exterior member fixed to the cover member.

5. The electronic apparatus according to claim 1, wherein the cover member is made of a metal on which surface treatment is carried out and the surface treatment is removed from an area contacting the discharge member.

6. The electronic apparatus according to claim 1, wherein in a display unit, a touch panel is stuck on a display surface.

* * * * *